Patented Dec. 4, 1928.

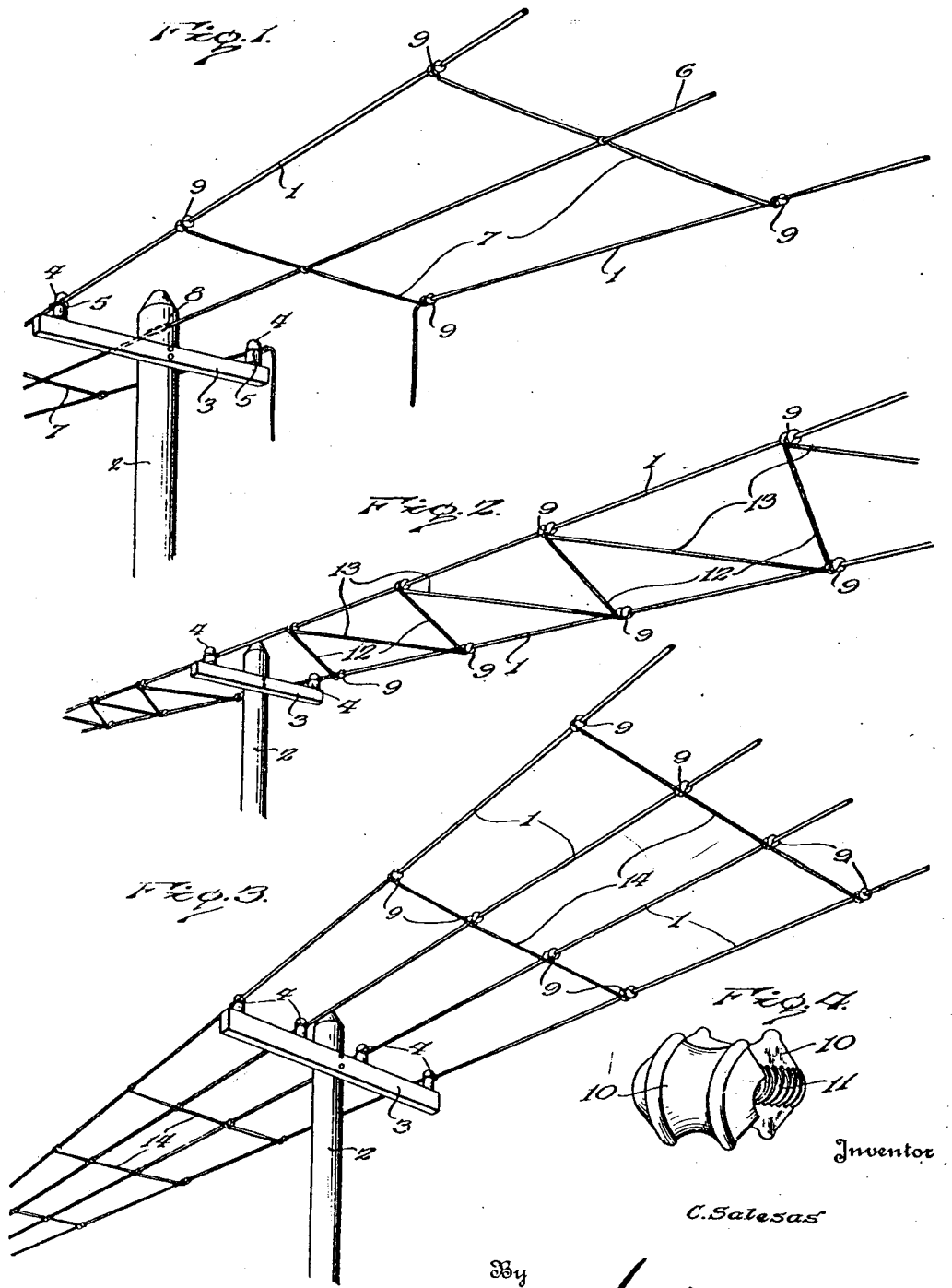

1,693,670

UNITED STATES PATENT OFFICE.

CARMELO SALESAS, OF GUANTANAMO, CUBA.

ELECTRIC-WIRE SUPPORT.

Application filed February 15, 1926. Serial No. 88,400.

This invention relates to an improved means for supporting wires charged with electricity and one object of the invention is to so support the wires that if one should become broken between the poles upon which they are strung the broken portions will be prevented from dropping upon the ground between the poles with the resulting danger of causing death or serious injury to a person upon whom the live wire may fall.

Another object of the invention is to so arrange the supporting means for the live wires that they may be prevented from dropping upon the ground in case a break should occur and at the same time prevent loss of current and also prevent a short circuit being formed.

Another object of the invention is to permit of the improved supporting means being formed from wire which may be cut the desired length and easily and quickly put in place when the live wires are strung upon the supporting poles.

This invention is illustrated in the accompanying drawing, wherein

Figure 1 is a perspective view illustrating one manner of erecting the supporting means for the live wires and showing one of the live wires broken;

Fig. 2 is a perspective view illustrating a modified manner of forming the supports for the live wires;

Fig. 3 is a perspective view illustrating a further modification of the supporting means for the live wires, and Fig. 4 is a perspective view of an insulator used in connection with the cross wires shown in Figs. 1, 2 and 3.

In Fig. 1, the live wires 1 have been shown supported in the usual manner by means of a pole 2 having a cross arm 3 at its upper end carrying the usual insulators 4 with which the wires 1 are connected in the usual manner by clips 5 which may consist of short pieces of wire. It will be understood that a number of the poles 2 are provided in proper spaced relation to each other, although only one has been shown in the drawing. Under present conditions, if one of the wires 1 should break between the poles, the separated ends will fall upon the ground and if one of them should drop upon a person standing or walking between the poles or if a person should accidentally come in contact with a fallen wire there would be danger of serious injury and may be death due to electrocution.

There has, therefore, been provided means to prevent the disconnected ends of a broken wire from falling upon the ground. The means illustrated in Fig. 1 consists of a strong wire or cable 6 which extends longitudinally of the wires 1 and intermediate thereof and cross wires 7 which extend transversely between the wires 1 and are attached to the wire 6 and at their ends connected with the wires 1. The wire 6, which may be termed a dead wire as no current passes through it is preferably led through an opening 8 formed in the upper end portion of each of the poles 2 above the cross arm 3, but it will be understood that it may be supported at the poles in any desired manner, and it will be further understood that it will be firmly secured at its ends by any suitable means. The cross wires 7 are preferably formed of a strong metal other than copper, and these wires are covered by insulation which will protect them from becoming wet by rain or snow. After the dead wire or supporting wire 6 has been strung from one pole to another and properly tightened, the wire from which the cross wires 7 are formed will be cut to form strands of the desired length and each cross wire will have its intermediate portion secured to the wire 6 by being either wrapped about the wire 6 or having a knot formed with the wire 6 passing through the knot. The portions of the wire 7 at opposite sides of the wire 6 are then extended to the wires 1 and the ends of the wire 7 tightly twisted about the insulators 9 carried by the wires 1. Since the wire 7 is engaged with insulators carried by the wires 1, current in the wires 1 cannot pass to the wires 7 and therefore loss of current or the formation of a short circuit is prevented. The insulators are formed as shown in Fig. 4 and referring to this figure it will be seen that each includes companion sections 10 adapted to be secured in operative relation to each other by the end portions of the wires 7. Ribs 11 are formed in the wire receiving grooves of the insulator sections so that the insulators will have firm gripping engagement with the wires 1 and not be liable to slip longitudinally thereon. In actual use, the wires 7 are preferably spaced about three feet apart, but it will be understood that the distance between the cross wires may be varied. It will be readily seen from an inspection of Fig. 1 that if one of the wires 1 should become broken between the supporting poles the major portion of the broken wire will be supported by the cross wires 7 and only the portions between the cross wires at opposite sides of the break will be permitted to hang downwardly. These depending end portions of the wire 1 will not be of sufficient length to come in contact with a person or vehicle beneath the broken wire and, therefore, there will be no danger of injury by electrocution.

In Fig. 2, there has been illustrated a modified manner of forming the supporting means to prevent the broken portions of a live wire from dropping upon the ground between the poles, and referring to this figure it will be seen that in this form the supporting wire or dead wire 6 of Fig. 1 has been eliminated. Instead of cutting the wire from which the cross wires 7 are formed into pieces of a length to extend between the live wires 1, the supporting means between the poles which take the place of the cross wires 7 are formed from a single length of insulated wire. One end of this insulated wire is twisted about an insulator carried by one of the live wires 1 and the supporting wire is then extended between the live wires, as shown at 12, and coiled about an insulator carried by the second live wire. After the insulated wire has been tightly engaged with the second live wire, it is extended diagonally between the wires, as shown at 13, and tightly coiled about a second insulator carried by the first live wire and then again extended between the live wires to form a second cross strand 12 and engaged with another insulator carried by the second live wire. This is repeated until a suitable number of cross wires 12 connected by diagonal wires or sections 13 have been formed between the poles. In this form the cross wires 12 which take the place of the cross wires 7 are firmly held in engagement with the live wires and are not only prevented from slipping longitudinally of the live wires by the ribs 11 of the insulators but also by the diagonally extending portions or brace wires 13. It will be obvious that if one of the live wires should break between the cross wires 12 the wire at opposite sides of the break will be supported by the cross wires and prevented from dropping upon the ground.

In Fig. 3, there has been shown a pole carrying four wires, all of which are live wires, but it will be understood that this number may be increased if so desired. The wires 14, which correspond to the wires 7, are formed of insulated wire and each has its intermediate portion coiled about insulators 9 carried by the intermediate live wires and has its ends engaged with insulators carried by the outer live wires in the same manner that the ends of the wires 7 are secured to the live wires. It will be understood that if found desirable the wires may be twisted about the insulators to hold their sections in firm engagement with each other and in tight gripping engagement with the wires 1. In the form shown in Fig. 3 it is not necessary to provide a dead wire, corresponding to the wire 6, as the intermediate live wires will take the place of a dead wire and serve very effectively to support the cross wires. Of course, if a break should occur in one of the intermediate live wires, the disconnected end portions between the poles will be supported by the cross wires in the same manner that a broken outer live wire would be supported and only short end portions of the broken wire would hang downwardly towards the ground.

It will, therefore, be seen that there has been provided a very effective means for supporting the live wires between poles upon which they are strung and that each of the various forms illustrated includes cross wires which are firmly anchored to the live wires in insulated relation thereto so that if a break occurs there will be no danger of a live wire falling upon the ground between the poles and causing death or serious injury to persons passing between the poles.

Having thus described the invention, I claim:

A support including a standard, a cross arm carried by said standard, and insulators carried by and projecting from the cross arm at opposite sides of the standard, line conductor wires spaced transversely from each other and connected with said insulators, a dead supporting wire extending between said conductor wires in spaced parallel relation thereto and supported from said standard above said cross arm, opposed insulators carried by said conductor wires and spaced longitudinally thereof, and cross wires extending between said conductor wires with their intermediate portions secured to the supporting wire and their ends secured about the insulators carried by the conductor wires.

In testimony whereof I affix my signature.

CARMELO SALESAS. [L. S.]